United States Patent [19]

Scherbarth

[11] Patent Number: 5,207,791

[45] Date of Patent: May 4, 1993

[54] UNIVERSAL SUPPORT FOR A HAND OPERATED DEVICE

[76] Inventor: Darryl Scherbarth, 10805 Dale Rd. SE., Yelm, Wash. 98597

[21] Appl. No.: 855,555

[22] Filed: Mar. 23, 1992

[51] Int. Cl.$^5$ .................. A63B 71/00; A63F 9/00
[52] U.S. Cl. .................. 273/148 B; 248/184; 248/284; 248/918
[58] Field of Search .......... 273/148 B, DIG. 19; 248/184, 284, 918; 400/715, 719; 108/43

[56] References Cited

U.S. PATENT DOCUMENTS

| | | | |
|---|---|---|---|
| 3,750,312 | 8/1973 | Bucher | 273/148 B X |
| 4,494,754 | 1/1985 | Wagner, Jr. | 273/148 B |
| 4,573,682 | 3/1986 | Mayon | 273/148 B |
| 4,630,823 | 12/1986 | Grant | 273/148 B |
| 4,648,603 | 3/1987 | Hayford, Jr. | 273/148 B |
| 4,715,293 | 12/1987 | Cobbs | 108/43 |

Primary Examiner—William H. Grieb
Assistant Examiner—Raleigh W. Chiu
Attorney, Agent, or Firm—Gifford, Groh, Sprinkle, Patmore and Anderson

[57] ABSTRACT

This is an invention for a universal support for a hand operated device such as a video game control, radio control transmitter or a computer/word processor keyboard. A platform holding the device and a base are pivotally locked to a connector. Angular adjustment of the platform and the base allows the support and the device to be adapted for standing, sitting and kneeling use.

8 Claims, 3 Drawing Sheets

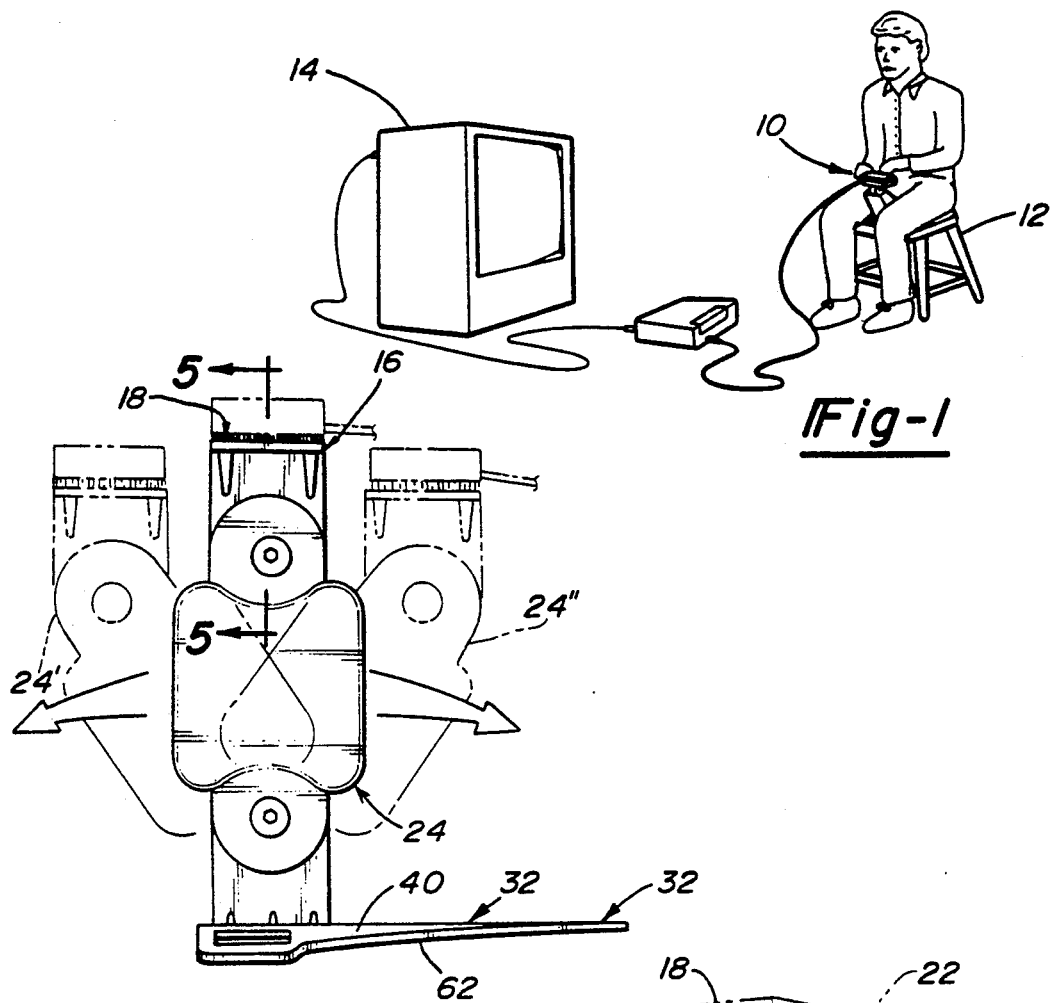
Fig-1
Fig-3
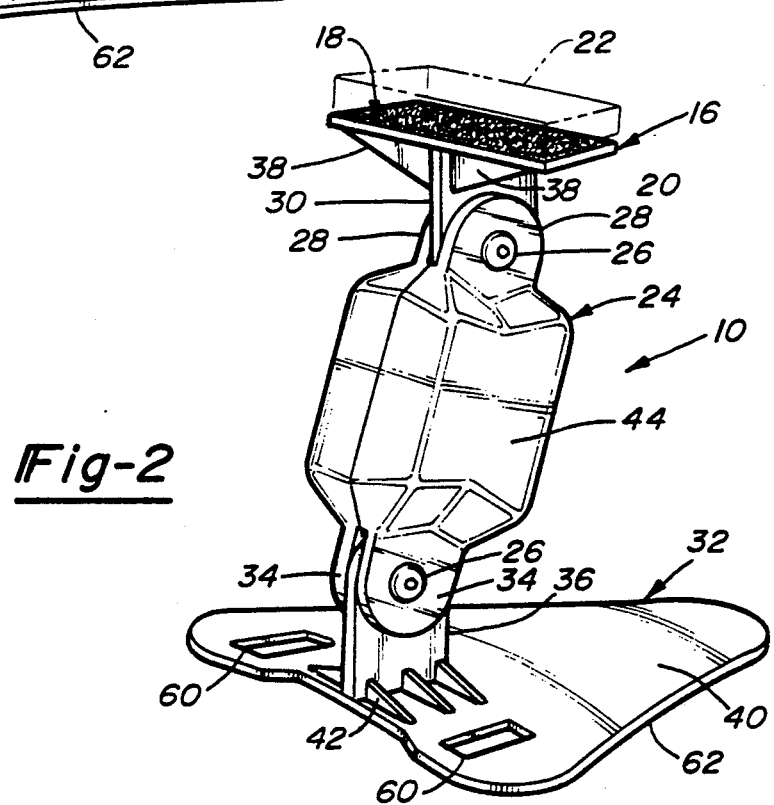
Fig-2

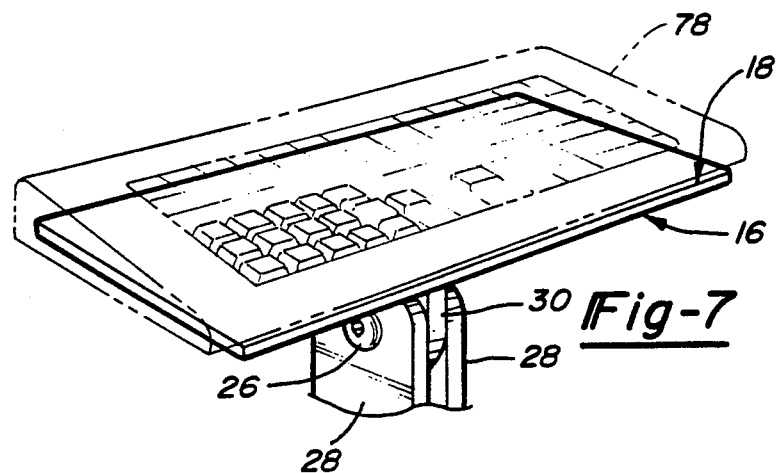
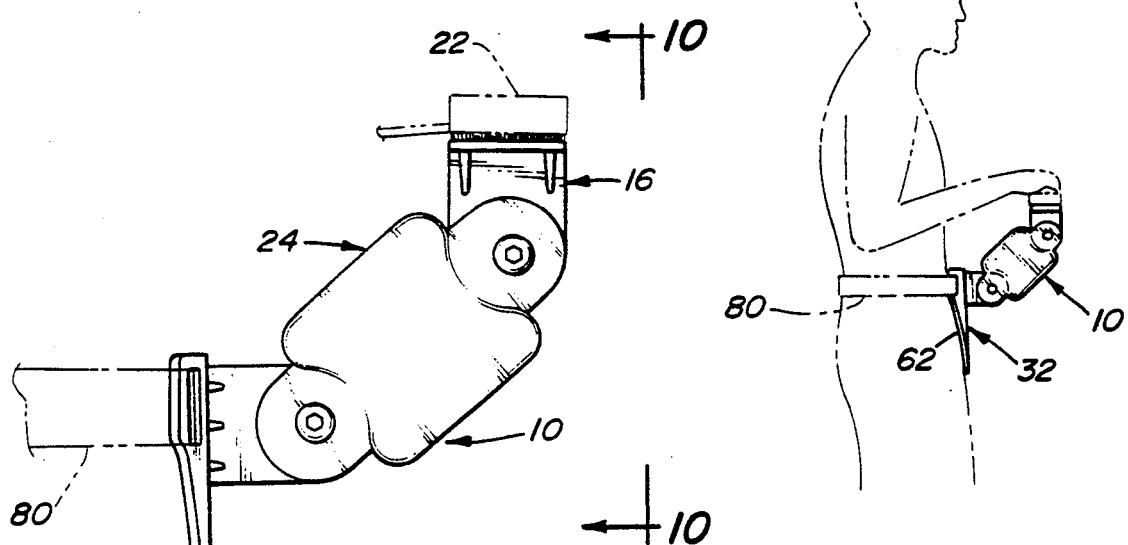
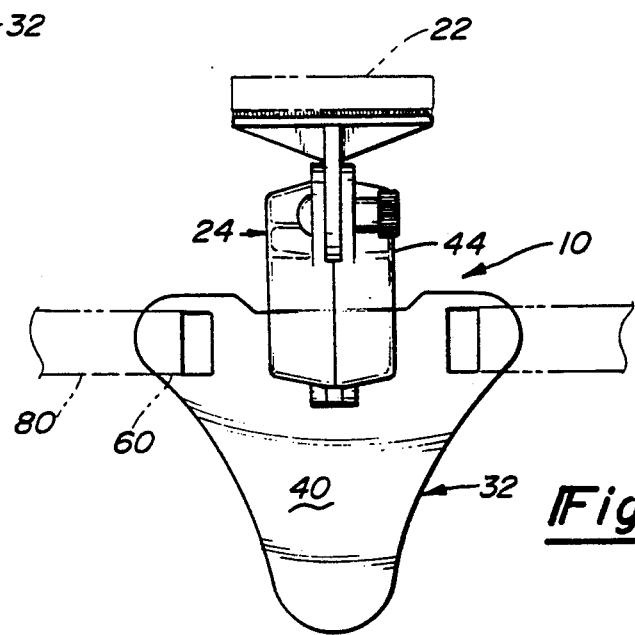

UNIVERSAL SUPPORT FOR A HAND OPERATED DEVICE

BACKGROUND OF THE INVENTION

1. Field of the Invention

The present invention relates to a support structure for hand operable devices. More particularly, this invention pertains to a support upon which a device can be placed or be detachably affixed for hand operation such as a support for a video control, lap top computer, radio control transmitter or the like. Such a video control can be for a variety of purposes ranging from television games to a conventional keyboard for a computer or word processing device used in conjunction with a CRT monitor.

2. Related Prior Art

There are a number of patents within the field of supports that are directed to supporting hand operable control units. These patents generally aim at making the control of these units more easy or more comfortable. U.S. Pat. No. 4,484,743 to Williams and 4,648,603 to Hayford disclose strap fastened supports for video game control units. Both patents show supports that may be attached to a person's thigh or lap by a strap or belt fastener. There are several disadvantages to using the Williams and Hayford supports. First, the flexible nature of the support against a person's thigh yields a support that gives as the control unit is used. In video game control, it is usually desired to have a rigid surface mounted joystick or control where movement of the control translates directly to movement on the screen with no lost motion. Second, both supports can become uncomfortable with extended use as the straps dig into a person's leg(s) causing poor blood circulation. Third, both supports are primarily limited in their use to joysticks. The flat control unit shown within Hayford would probably not be used by most video game players because most players wish to grasp this type of control unit with both hands.

A second type of video game support is shown within U.S. Pat. Nos. 4,573,682 to Mayon and 4,494,754 to Wagner. This type of support has a rigid platform for the video game control unit and a rigid base that can rest against a floor, chair or other firm surface. These supports correct some of the deficiencies of Williams' and Hayford's supports by providing a rigid support for the control unit and providing a mounting platform that is graspable by a person's hands for non-joystick control units. However, there are further disadvantages to the use of the supports shown within Mayon and Wagner. First, the rigid nature of these supports does not allow any adjustment to a person's unique preferences in playing video games. Many players prefer to use the control units at different angles or in different configurations than those offered by the supports of Mayon and Wagner. Second, the rigid nature of the supports can be uncomfortable with extended use. In both the sitting and kneeling positions, there is nothing within the supports that cushions the person's body. Finally, both supports are primarily intended as video game controller supports with little application outside of this narrow purpose.

One other video game control support is disclosed within the U.S. Pat. No. 4,630,823 to Grant. The support shown within FIGS. 6 and 7 show a support that is adjustable in angle for holding a video game controller. Although the support's control platform is angularly adjustable, its base is nevertheless rigid and uncomfortable. The control platform is graspable by a player's fingers, but the semi-closed box makes the support impractical for any use other than a video control mechanism.

A common disadvantage to all of these supports is that the supports are restricted in use to video game control. Another common disadvantage is that the supports generally fail to address physiological problems associated with playing games for extended periods of time. It has been shown that extended playing of video games can cause tendinitis or even arthritis to occur in a person's arm, wrist and fingers. Wagner's support attempts to resolve this problem by providing a platform upon which a player can rest his/her wrists or hands while using the control unit. However, when using this rigid platform with a joystick, the player's hand, wrist and arm remains unsupported. To avoid the aforementioned physiological problems it is best to support the player's arms and hands on a resting surface or on a person's lap or sides. The prior art supports have generally failed in addressing these problems.

An additional difficulty presented in most prior art supports is, that if the holding surface can be pivoted, as in the Grant patent above, the adjusted position is maintained only by friction and is subject to slippage in use.

Finally, all of the prior art supports, noted above, use complicated shapes that are expensive to manufacture. Most of them are made of hard plastic which can be uncomfortable or abrasive against the skin, in use. There has been a pressing need in the art of supports for a versatile and comfortable support for all types of hand operable articles. Further, none of the prior art supports can be universally used as being capable of support against the body of the user or against a datum surface such as a chair, seat or floor.

SUMMARY OF THE INVENTION

The support of the present invention provides universality in being capable of use with the person in a standing position, being supported by a belt around the waist of the person and stabilized against his abdominal region, or in any of a variety of sitting and kneeling positions being supported on a datum such as a chair seat or a floor surface.

The universal support has a platform with a holding surface which holds the device. In a preferred embodiment, a positive fastener such as a Loop and pile type of fastener is used. A base has a datum engaging surface and a body engaging surface as well as a belt attachment. A connector has a first pivot connection at one of its ends to the platform and a second pivot connection at its other end to the base. A first lock locks the platform to the connector in a selected angular orientation at the first pivot connection. A second lock locks the base to the connector in a selected angular orientation at the second pivot connection. The pivot connections are made with threaded fasteners so that the position can be changed by loosening the fastener.

With this arrangement the base can be pivoted relative to the connector to a first position and locked to the connector so that it can be attached to the user's body by a belt, supporting the datum engaging surface against the user's abdominal area. Likewise the platform can be pivoted relative to the connector to a second angular position and locked so that the device can be freely manipulated by the user's hands and fingers.

In a second mode of the device the base is pivoted relative to the connector to a third angular position and locked so that the base can be supported on a datum surface as the user's legs engage the body engaging surface of the base. The platform can be pivoted relative to the connector to an advantageous position so that the hand operated device can be freely manipulated by the user's hands and fingers.

The lock is preferably of the positive type using interdigitating members which hold the base and platform against any slippage. Cooperating detents angularly spaced around the pivot connections provides such a positive lock. Either the support or the base and platform members have circular or spherical recesses which are engaged by a pin or a series of projections on the other of the support or the base and platform members.

In a preferred embodiment of the inventions an entire circular array of inner engaging detents are used.

BRIEF DESCRIPTION OF THE DRAWING

The advantages of the present invention will be more apparent from the following detailed description when considered in connection with the accompanying wherein:

FIG. 1 is a perspective view showing a person using the support pressed against the datum surface of a chair seat by the person's legs with the hand operated device being a video game control system;

FIG. 2 is a perspective view of the universal support in a position in which it can be used in the environment of FIG. 1 or as it can be pressed against the floor datum surface by the knees or straddled legs of the user;

FIG. 3 is an elevational view of the universal support of this invention as shown in FIG. 2 showing in phantom a range of pivotal positions that can be obtained;

FIG. 7 is a perspective view similar to that shown in FIG. 6 showing a conventional keyboard type of control device attached to the holding surface of the platform;

FIG. 8 shows the universal support of the invention as it is employed by the user in a standing position supported by a belt and against the abdomen of the user;

FIG. 9 is an enlarged view of the universal support as it is being used in FIG. 8; and FIG. 10 is a front view of the support taken along line 10—10 in FIG. 9.

FIG. 1 shows the universal support 10 of this invention in one of its most popular modes of use with the user clamping the support between and underneath his legs. He is seated on a chair or bench 12 with the support angularly adjusted so he can conveniently view the television receiver 14 as he manipulates a control device by the use of one or both hands which are free for this purpose.

As shown in FIG. 2, the elements of the universal support 10 include platform 16 having a holding surface 18 with a VELCRO ® type hook and loop fastening device 20 attaching a hand operated control device 22 shown in phantom. Platform 16 is pivotally attached to a connector 24 by the use of a threaded fastener 26 passing through upper mounting ears 28 of connector 24 and mounting ear 30 of platform 16. Base member 32 is similarly mounted to connector 24 by the use of threaded connector 26 passing through lower connector mounting ears 34 and base mounting ear 36. Mounting ear 30 extends at a right angle or is perpendicular to the holding surface 18 of platform 16, and the rigidity and integrally of the structure is assured by integrally molded gussets 38. Similarly the mounting ear 36 of base member 32 is perpendicular to the body engaging surface 40 of base 32 being strengthened by integrally molded gussets 42.

As seen in FIG. 3, the connector 24 can be pivotally swung in either direction to or beyond the position to the left or counterclockwise as shown in phantom at 24' or to the right or clockwise to or beyond the position shown in phantom at 24". The position shown at 24' might correspond to the comfortable position of the platform as it is being used in FIG. 1, and the 24" position may be the comfortable position being used when the base 32 is being supported on a datum surface such as a floor being straddled by the knees of the user. The connector 24 has an expanded body portion 44 against which the user's legs may be pressed as shown in FIG. 1. The base 32 also forms a three point stand as best shown in FIG. 3.

Figures 4, 5, 6:
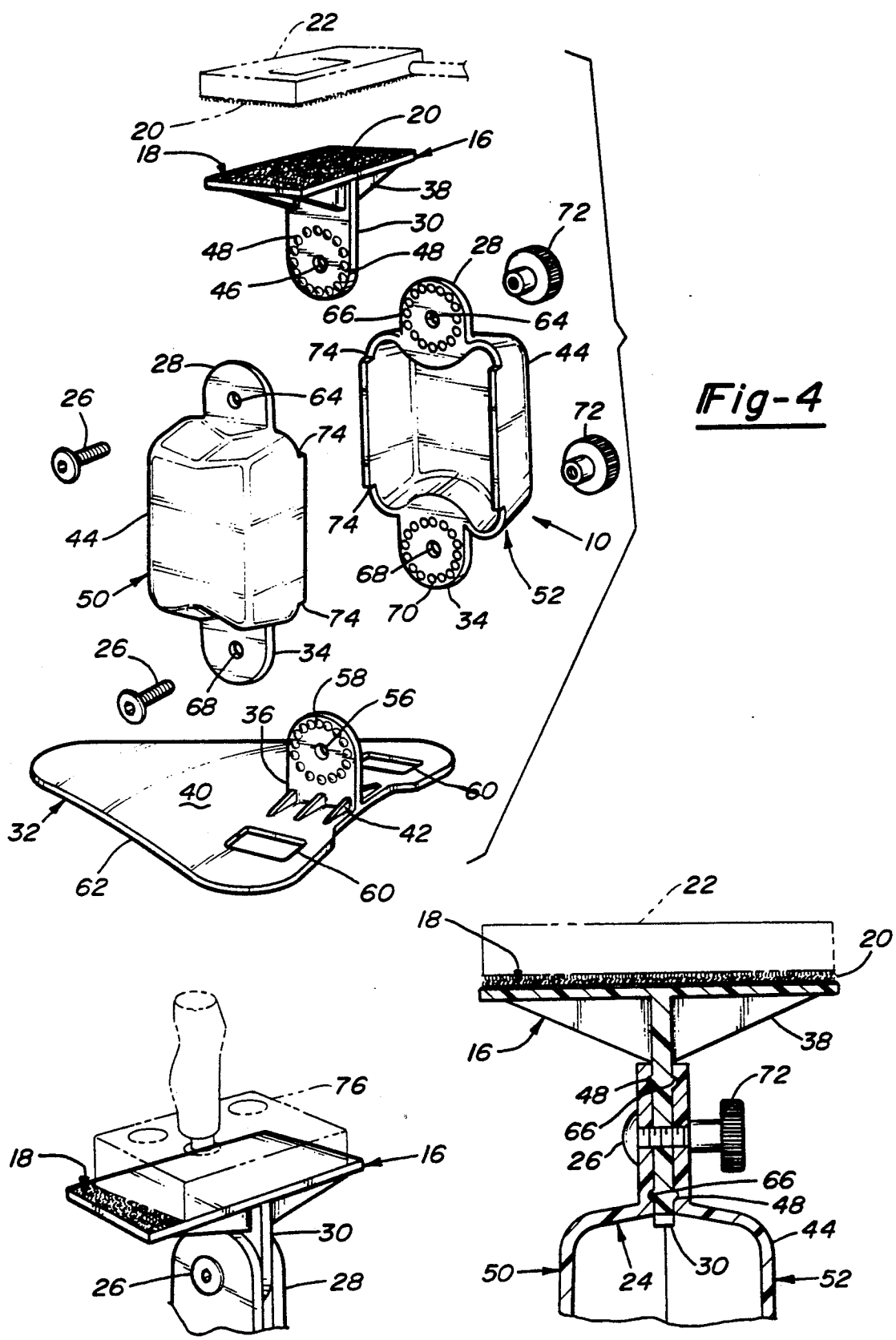
FIG. 4 is an exploded perspective view of the universal support clearly indicating the manner of assembly.
FIG. 5 is a partial cross sectional view taken along line 5—5 of FIG. 3 showing a preferred form of a threaded fastener and thumb nut in its tightened position with the detent locking means in its fully locked position.
FIG. 6 is a perspective view of the platform with a joystick type of control shown in phantom as it would be supported on the holding surface of the platform.

As shown in more detail in FIG. 4, the platform 16 has a portion of the VELCRO ® fastener 20 adhesively secured to the planar holding surface 18 and the complimentary portion of the VELCRO ® fastener 20 is adhesively affixed to the bottom of the hand operated device 22.

Centrally located in the depending mounting ear 30 is aperture 46 for receiving threaded fastener 26. Surrounding the aperture 46 is a circular array of equally spaced semi-spherical projecting detents 48. These detents 48 extend outwardly from each face of ear 30 as seen in FIG. 5.

Ear 36 of base 32 has a centrally located aperture 56 for also receiving a threaded fastener 26. Surrounding this central aperture 56 is a circular array of semi-spherical projecting detents 58. These detents also project outwardly from each side of ear 36 in the same manner as the detents 48 project outwardly from both sides of ear 30. Additionally, base 32 has belt or strap receiving openings 60 and a datum engaging surface 62 opposite body engaging surface 40.

The connector made with a strong and a pliable plastic is molded in two complimentary parts 50 and 52.

Each of the upwardly extending ears 28 of connector parts 50 and 52 have a centrally located aperture 64. Surrounding aperture 64, on the facing surfaces of ear 28, is a circular array of equally spaced semi-spherical detent receiving recesses 66. Likewise, each of the downwardly extending ears 34 of connector parts 50 and 52 have a centrally located aperture 68. Surrounding aperture 68 on the facing surfaces of ears 34 is a circular array of equally spaced semi-spherical detent receiving recesses 70.

In assembling the parts 50 and 52 of connector 24 platform 16 and base 32, the downwardly projecting ear 30 of platform 16 is inserted between the upper mounting ears 28, and the upwardly projecting ear 36 of base 32 is inserted between lower mounting ears 34 of the parts 50 and 52 which are brought together trapping the ears 30 and 36 between opposed pairs of ears 28 and 34, bringing the apertures 64 in line with aperture 46 and the apertures 68 in line with aperture 56 so that a threaded fastener can be inserted through aperture 64, 46 and 64, and another threaded fastener 26 can be inserted through apertures 68, 56 and 68. Thumb nuts 72 are threaded onto the free end of threaded fasteners or bolts 26, and, as these are tightened, the detents 48 on ear 30 will be seated in the recesses 66 in ears 28 as seen in FIG. 5. Likewise, the detents 58 will be seated in recesses 70. This positive lock prevents any shifting or slippage of the platform 16 or the base 32 relative to connector 24 until the thumb nuts 72 are intentionally loosened to adjust the platform or base to a new angular orientation. Both connector parts 50 and 52 are recessed at 74 at both ends in order to allow an adjustment of almost 180° between the platform 16 and connector 24 and the base 32 and connector 24.

FIGS. 6 and 7 show two commonly used forms of hand operated devices 22 in the forms of a joystick control 76 in FIG. 6, and a keyboard control 78 in FIG. 7.

FIGS. 8-10 show the universal support 10 employed in a manner allowing the user to stand while it is attached to his body through belt 80 passing through slots 60 in base 32 and encircling the user's waist. The user can also rest his hands on the universal support 10. The datum engaging surface 62 of the base 32 stabilizes the universal support 10 against the user's abdominal region. As seen in FIGS. 2, 3, 4, 8 and 9 the base has a slight arcuate bow to better conform to the user's body. When the datum surface 62 of the base 32 is pressed against a stationary datum surface such as the chair seat as shown in FIG. 1 or against the floor in the orientation of FIG. 2, this bow has a tendency to flatten by the force or weight of the user's legs.

The two-piece hollow molded part halves 50 and 52 of connector and its easily engaged body portion 44 along with the light weight but strengthened structure of platform 16 and base 32 provide an easily employed support for the user's hand held device 22. The pivotal adjustment and positive detent locks of the platform and the base relative to the connector allows angular adjustments to be made to accommodate the comfort of the user and allows conversion from a body supported datum to a fixed surface datum so that the operated device can be supported when the user is standing, sitting or kneeling.

I claim:

1. A universal support for a hand operated device comprising:
   a platform having a holding surface for holding said device;
   a base having datum engaging surface, a body engaging surface, and belt receiving means for attachment to a user's waist;
   a connector connected to pivot about a first axis at one end to said platform and connected to pivot about a second axis parallel to said first axis at its other end to said base;
   first lock means for locking said platform to said connector with a selected angular orientation at said first pivot connection;
   second lock means for locking said base to said connector with a selected angular orientation at said second pivot connection; and
   wherein when said base is pivoted relative to said connector to a first angular position and locked so that the base is attached to the waist of the user's body by a belt, supporting the datum engaging surface against the user's abdominal area, and said platform is pivoted relative to said connector to a second angular position and locked so that said platform is in a plane transverse to a plane containing said base and said hand operated device is held on said holding surface and freely manipulated by the user's hands and fingers;
   wherein when said base is pivoted relative to said connector to a third angular position and locked so that said base can be supported on a datum by said datum engaging surface as the user's legs engage said body engaging surface, and said platform is pivoted relative to said connector to a fourth angular position and locked so that said platform is in a plane substantially parallel to a plane containing said base and said hand operated device can be held on said holding surface and freely manipulated by the user's hands and fingers; and
   wherein said apparatus is pivotal between a first position and a second position, said positions being mutually exclusive of each other.

2. The universal support according to claim 1 including a fastener for securing said device to said holding surface.

3. The universal support according to claim 2 wherein said fastener is a loop and pile-fastener.

4. The universal support according to claim 1 wherein said first and second pivot connections each include releasable fasteners and said first and second lock means each include interdigitating members whereby said fastener can be released to unlock said interdigitating members for pivotal movement of said platform and base to selected angular orientations relative to said connector.

5. The universal support according to claim 4 wherein said releasable fasteners each include a threaded fastener and a thumb nut.

6. The universal support according to claim 4 wherein said interdigitating members include cooperating detents angularly spaced around said first and second pivot connections.

7. The universal support according to claim 6 wherein said detents include projections on ones to said connector, platform and base, and include projection receiving recesses on others of said connector, platform and base.

8. The universal support according to claim 1 wherein said connector has an outwardly extending body portion between its ends for engagement by leg portions of the user.

* * * * *

UNITED STATES PATENT AND TRADEMARK OFFICE
CERTIFICATE OF CORRECTION

PATENT NO.   : 5,207,791

DATED        : May 4, 1993

INVENTOR(S)  : DARRYL SCHERBARTH

It is certified that error appears in the above-identified patent and that said Letters Patent is hereby corrected as shown below:

Column 2, line 49, change "Loop" to --loop--; and column 3, line 23, after "accompanying" insert --drawings--.

Signed and Sealed this

Twenty-sixth Day of April, 1994

Attest:

BRUCE LEHMAN

Attesting Officer

Commissioner of Patents and Trademarks